Figure 17:
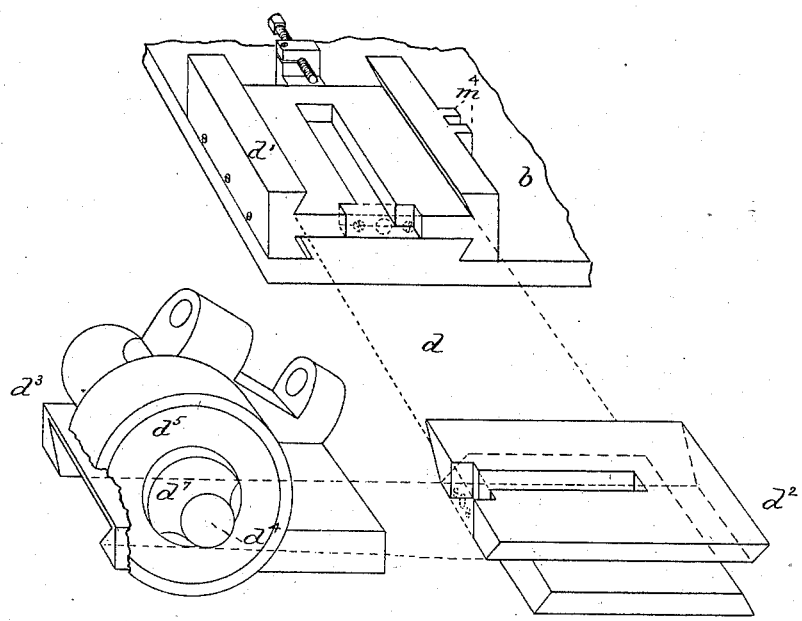

(No Model.)  5 Sheets—Sheet 1.
M. C. JOHNSON.
DRILL MILLING MACHINE.
No. 324,845. Patented Aug. 25, 1885.
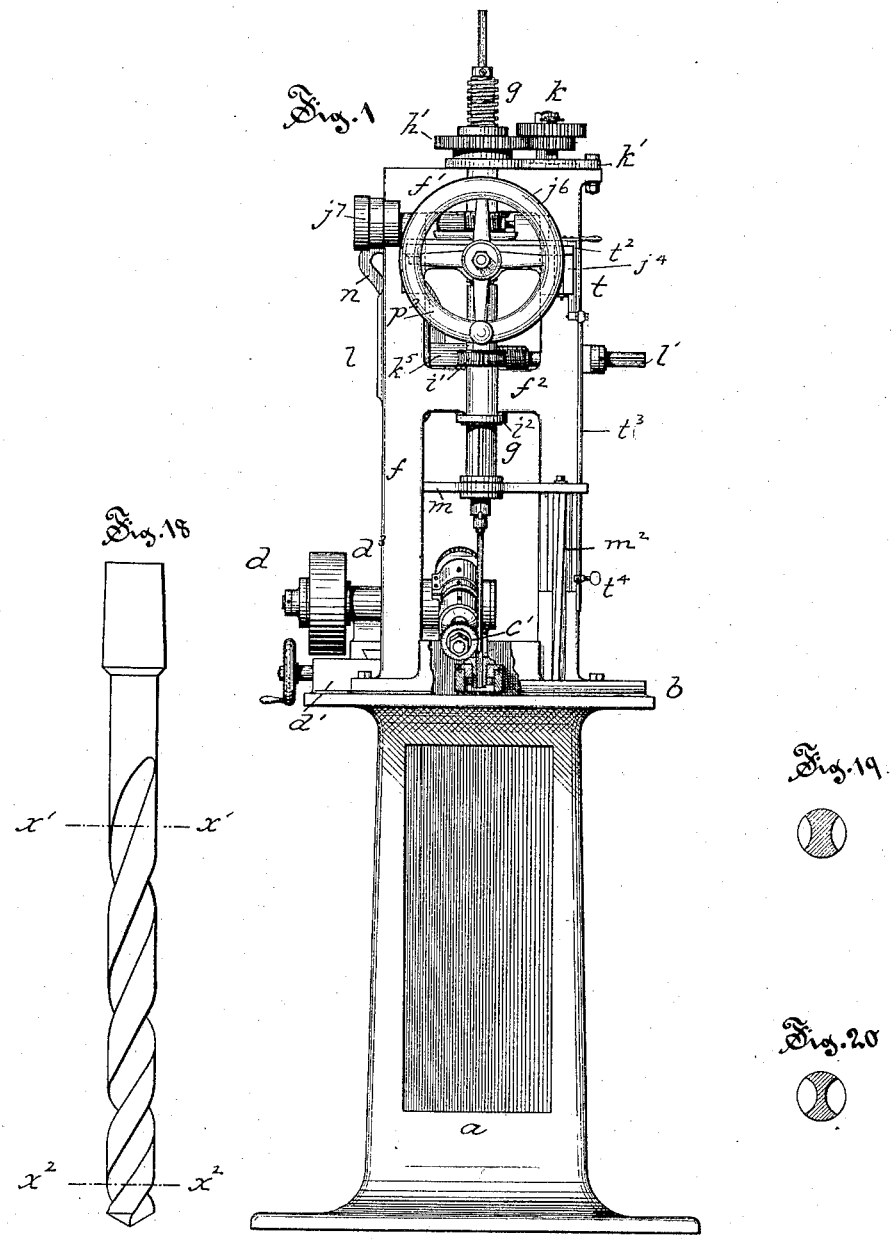

(No Model.) 5 Sheets—Sheet 2.
M. C. JOHNSON.
DRILL MILLING MACHINE.
No. 324,845. Patented Aug. 25, 1885.
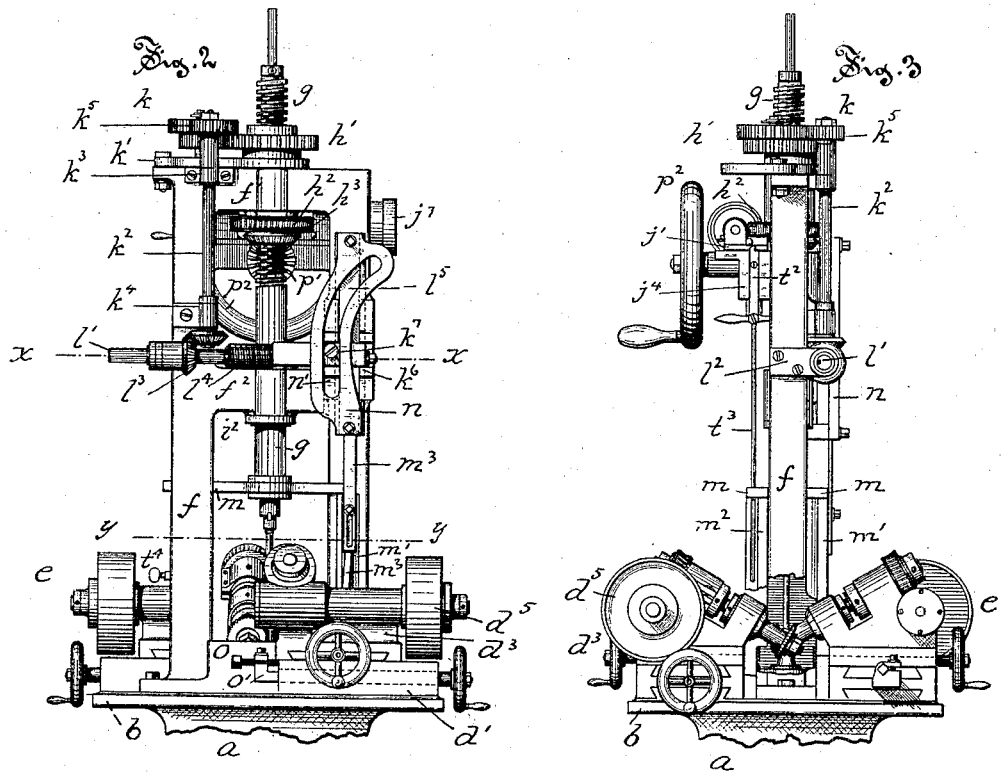
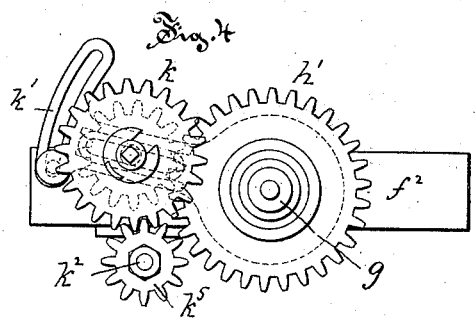
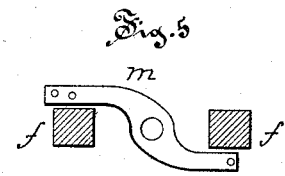
Witnesses
W. M. Bjorkman
E. F. Dimock
Inventor
Moses C. Johnson
by Simonds & Burdett,
Attys (No Model.) 5 Sheets—Sheet 3.
M. C. JOHNSON.
DRILL MILLING MACHINE.
No. 324,845. Patented Aug. 25, 1885.
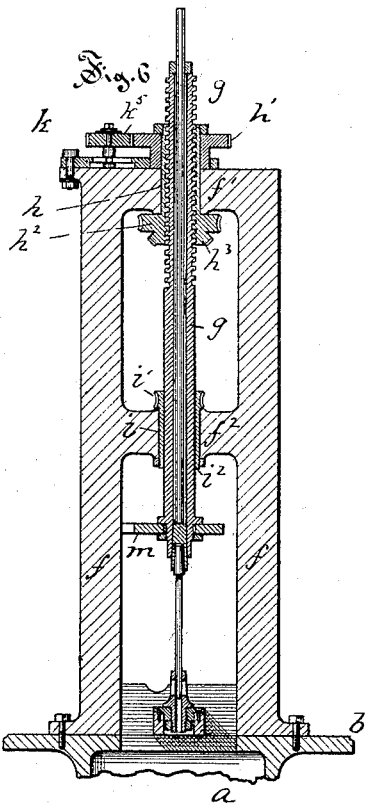
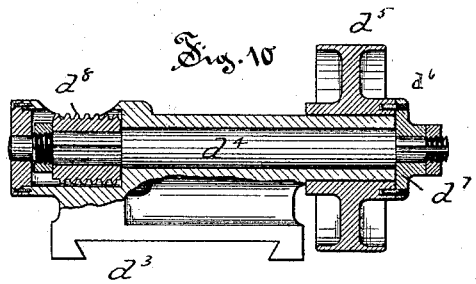
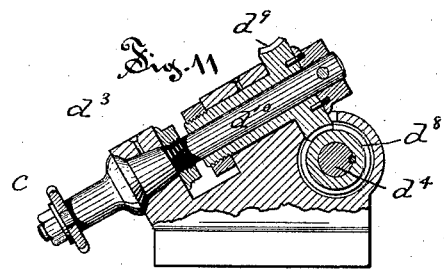
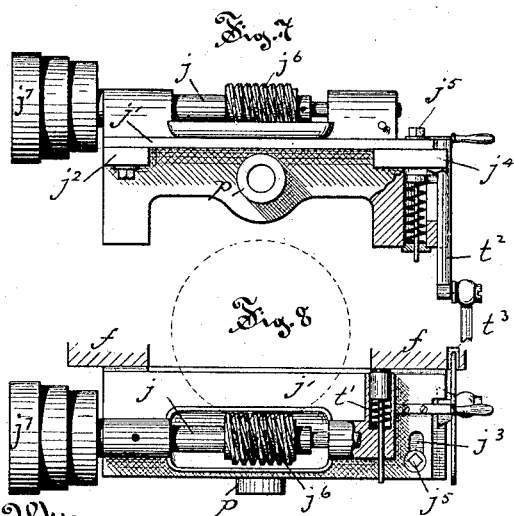
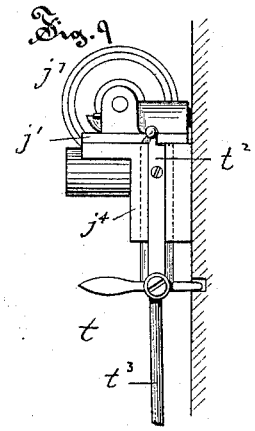
Witnesses
W. M. Kjerlumann
E. F. Linock
Inventor
Moses C. Johnson
by Simonds & Burdett
Attys.

(No Model.) 5 Sheets—Sheet 4.
M. C. JOHNSON.
DRILL MILLING MACHINE.
No. 324,845. Patented Aug. 25, 1885.
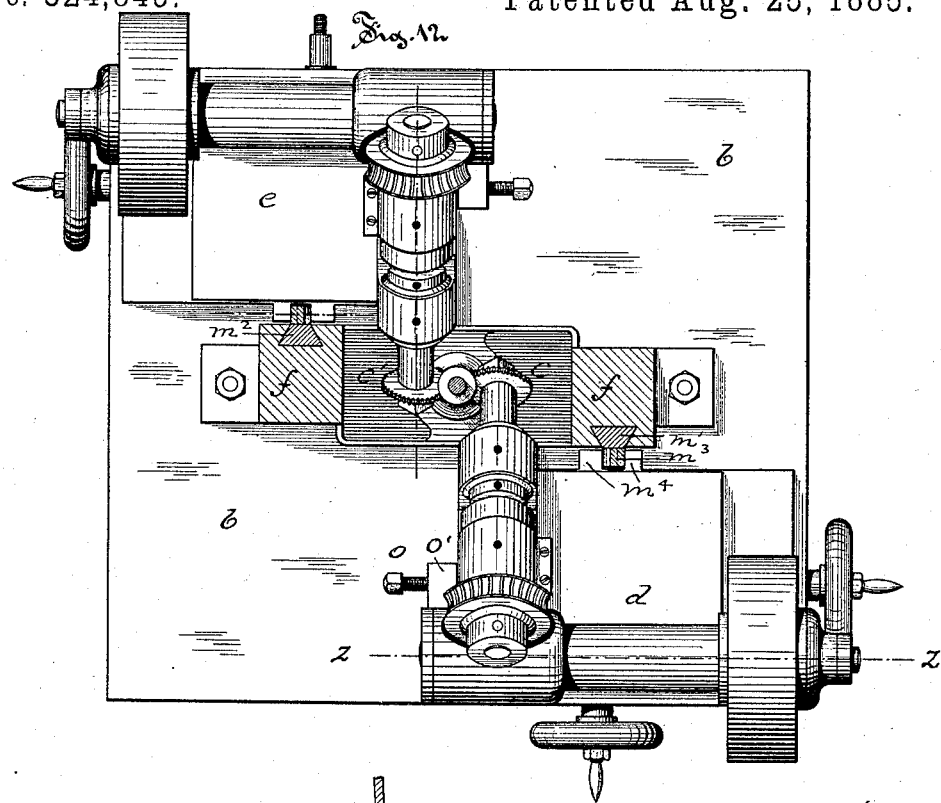
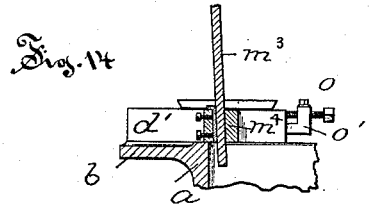
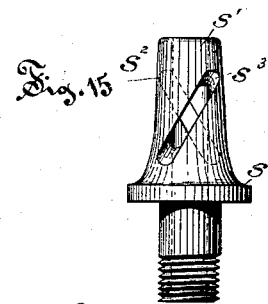
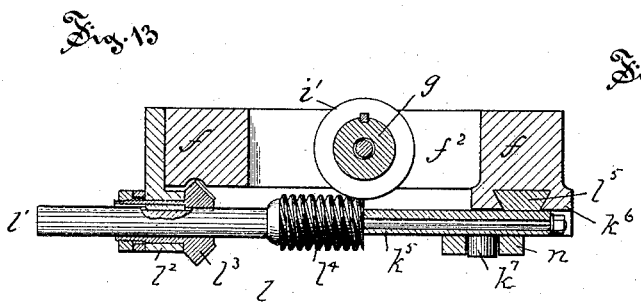
Witnesses
W. M. Bjorkman
E. F. Dimock
Inventor
Moses C. Johnson
by Simonds & Burdett,
Attys.

(No Model.)  M. C. JOHNSON.  5 Sheets—Sheet 5.
DRILL MILLING MACHINE.

No. 324,845.   Patented Aug. 25, 1885.

UNITED STATES PATENT OFFICE.

MOSES C. JOHNSON, OF HARTFORD, CONNECTICUT, ASSIGNOR OF ONE-HALF TO AMOS WHITNEY, OF SAME PLACE.

DRILL-MILLING MACHINE.

SPECIFICATION forming part of Letters Patent No. 324,845, dated August 25, 1885.

Application filed May 3, 1884. (No model.)

*To all whom it may concern:*

Be it known that I, MOSES C. JOHNSON, of Hartford, in the county of Hartford and State of Connecticut, have invented certain new and useful Improvements in Twist-Drill-Milling Machines; and I do hereby declare that the following is a full, clear, and exact description thereof, whereby a person skilled in the art can make and use the same, reference being had to the accompanying drawings, and to the letters of reference marked thereon.

Like letters in the drawings indicate the same parts.

Figure 1 is a front view, in elevation, of my improved machine, one cutter broken away. Fig. 2 is a rear view, in elevation, of the part of the machine above the standard. Fig. 3 is a side view of the same in elevation, looking from the right, as the machine is shown in Fig. 1. Fig. 4 is a detail top view of the feed-gears appurtenant to the main spindle. Fig. 5 is a detail plan view of the slide-yoke, showing the side bars of the frame in cross-section. Fig. 6 is a detail view in vertical central section of the main spindle and frame. Fig. 7 is a detail front view, on enlarged scale, of the bracket bearing the main driving-shaft with worm, and of part of the stop mechanism. Fig. 8 is a detail plan view of the parts shown in Fig. 7. Fig. 9 is a detail end view of the same, looking from the right. Fig. 10 is a detail view in longitudinal section of one of the horizontal shafts of the cutter-driving mechanism on plane $z\ z$. Fig. 11 is a detail view in longitudinal section of a cutter-shaft. Fig. 12 is a plan view of the bed and the cutter-driving mechanism, on enlarged scale, on plane $y\ y$ of Fig. 2. Fig. 13 is a detail view in section of the vertical frame, and partly in section of the variable feed mechanism on plane $x\ x$. Fig. 14 is a detail view of the cutter-moving slide, parts in vertical section. Fig. 15 is a detail side view of the drill-blank guide and rest. Fig. 16 is a detail top view of same. Fig. 17 is a detail view, on enlarged scale, of the cutter-bearing carriage, showing the intermediate and upper carriage slid apart to better illustrate their construction and operation. Fig. 18 is a detail diagram view of a twist-drill as produced by means of my machine. Fig. 19 is a sectional view on plane denoted by line $x'\ x'$ of Fig. 18. Fig. 20 is a detail sectional view on plane denoted by line $x^2\ x^2$ of Fig. 18.

My invention has for its object the production of a machine by the use of which twist-drills can be grooved or fluted with greater rapidity, uniformity, accuracy, and economy than can be done by any previous method or machine; and it consists in the new and also the improved devices, and in their combination for holding, feeding, and milling a drill, and in details of construction of the various parts, as more particularly hereinafter described.

Although the machine and process herein described are particularly intended for use in making twist-drills, they are evidently, without substantial change, adaptable for use in making a wide range of articles, and for all such they are claimed.

The within described machine consists of a frame supported in a vertical position on a standard and base and bearing a vertical driving-spindle, driving and feeding mechanism, variable feed mechanism, by which the pitch of the groove is determined, cutter driving and feeding mechanism, and stop mechanism, all so united as to automatically cut the grooves in a twist-drill in a uniform twist or pitch, or an increased pitch, or in any variation of these, to increase in a regular degree from the point upward the thickness of the web left in grooving, and to stop the machine when a drill is completed.

In the accompanying drawings, the letter $a$ denotes a standard of any convenient shape, and preferably of iron, cast hollow, with an opening on the front, having on its upper end a horizontal bed, $b$, supporting the cutter mechanisms $d$ and $e$, attached to the bed by the lower and upper sliding carriages, $d'\ d^2\ d^3$; $f$, a vertical frame rising about centrally of the bed and supporting the rotary and vertically-reciprocating main spindle $g$, which holds the drill-blank while it is being grooved. This main spindle is arranged in bearings secured in the cross-bars $f'\ f^2$ of the frame $f$. The upper bearing is in a sleeve, $h$, rotarily secured in the upper cross-bar, $f'$, of the frame, and this sleeve is threaded on its inner surface to fit the threaded upper end of the main spindle. It bears fast to its upper end that projects above the bar $f'$ a gear-wheel, $h'$, and fast to its lower end a worm-gear, $h^2$, that is held between the lower side of bar $f'$ and a beveled gear, $h^3$, also fast to the sleeve $h$. This sleeve may be likened to a nut held against endwise play, but by its revolution causing the main spindle to feed up and down through it.

The main spindle $g$ is splined onto the worm-gear $i'$, which is fast to the upper end of sleeve $i$, which, passing through a vertical socket in the lower bar, $f^2$, is held against vertical play by means of the nut $i^2$, that forms a shoulder against the lower side of the bar, while the worm-gear forms a shoulder on the upper side.

The driving-shaft $j$ is supported in bearings in the swinging frame $j'$, pivoted at one end to a bracket, $j^2$, on the front side of the main frame. The other end of the frame has a slot, $j^3$, through which a bolt passes from the bracket $j^4$, and to which the frame is clamped by a nut, $j^5$, when it is desired to hold the worm $j^6$, which is fast to the shaft $j$, in mesh with the worm-gear $h^2$, fast to sleeve $h$.

A pulley, $j^7$, is fast to the outer end of the shaft $j$, and by means of a belt may be driven from any suitable counter-shaft. By the rotation of the driving-shaft $j$ the sleeve $h$ is turned, and with it the gear-wheel $h'$ of the feed mechanism $k$, which is a series of gears (compound) borne on a short shaft fixed to the swinging yoke $k'$, and adjustable to permit the change of size of the intermeshing gears necessary to a change of the rate of speed that determines the lead of the spiral groove in the drill. This is a common device, and does not require a detailed description to enable a mechanic to understand the operation.

The shaft $k^2$ is held in a vertical position in bearings $k^3$ $k^4$, bolted to the frame $f$, is held by collars against endwise play, and bears on its upper end a gear-wheel, $k^5$, in mesh with the train of compound gears, and on its lower end a bevel-gear in mesh with a similar gear, $l'$, rotarily held in a bearing, $l^2$, bolted to the side of the frame $f$.

The bevel-gear $l^3$ is splined to the sliding shaft $l'$ of the variable lead mechanism $l$. This latter is new and is an important feature of my invention.

To the shaft $l'$ is secured a worm, $l^4$, and beyond this the shaft is reduced in diameter and extends through a long rectangular slide, $k^5$, fastened to the shaft by a nut at the end. (See Fig. 13.) This slide is supported and reciprocates horizontally in guides $k^6$ on the side of the frame $f$.

The rotation of the shaft $l'$ and the worm $l^4$, which is in mesh with the worm-gear $i'$ on the sleeve $i$, turns the main spindle $g$, while it is fed up or down by the rotation of nut $h$. These spindle-driving devices are all connected, as already described, and are all moved by the turning of the driving-shaft $j$, so that a drill-blank held in a chuck in the lower end of the spindle is both advanced and rotated past the cutters on the bed. As long as the shaft $l'$ is held against endwise movement the lead or pitch of the groove in the drill will be regular; but means are provided for varying this pitch.

Attached to the spindle $g$, near its lower end, is a slide-yoke, $m$, whose ends extend to each side of the frame $f$, one end to the front and the other to the rear of the frame, (see Figs. 1, 2, and 5,) where they are fastened to the vertical slides $m'$ $m^2$. The slide $m'$ is pivotally connected by the link $m^3$ to the lower end of the eccentric guide $n$, that is pivoted at its upper end to the slide $l^5$, that moves in a dovetailed socket in the frame $f$, (see Fig. 13,) and back of and at right angles to the slide $k^5$. A stud, $k^7$, projects from this latter slide into the cam-slot $n'$ in the eccentric guide $n$, and the vertical reciprocation of the spindle (communicated by the yoke and slides to the guide) feeds the shaft $l'$ and worm $l^4$ back and forth across the worm-gear $i'$ as the guide $n$ rises and falls.

The worm-gear $i'$ is driven by the worm $l^4$; but any forward motion of the worm at the same time that it is turning tends to decrease the speed or rate of rotation of the gear, and it is evident that this forward motion of the worm may be so adjusted that its rotation will not cause the least rotation of the worm-gear. In this event the spindle $g$ and the drill will be fed past the cutters without any rotation, and a straight groove along the drill will be the result of the cutting.

By fixing the angle of the groove $n'$ in the guide $n$ any desired pitch or variation of pitch in the groove from a straight line to a true spiral may be given.

Upon the horizontal bed $b$ two duplicate sets of cutter mechanisms are fixed, so that the cutters shall operate simultaneously upon diametrically-opposite sides of a drill-blank, each cutter working in a plane at the same angle with, but on opposite sides of, a vertical plane, and a description of one set will explain the construction and method of operation of both.

In the upper carriage of the cutter mechanism $d$ a shaft, $d^4$, is arranged in a bearing-socket, with its axis in a plane parallel to one passing widthwise through the center of frame $f$. The pulley $d^5$ is arranged so as to turn freely on the outside of a projection, $d^6$, of the socket-piece, and the hub of this pulley is secured to the driving-disk $d^7$, that is splined on the shaft $d^4$, and held between a shoulder on the shaft and a nut on its outer end. By this device the pull of a belt on the pulley and any wear of the shaft in its socket in the direction of the countershaft is prevented.

A worm, $d^8$, is splined to the inner end of the shaft and meshes with a worm-gear, $d^9$, on the upper end of the cutter-spindle $d^{10}$, that is rotarily held in bearings in the slide, with its axis in a plane at right angles with the plane of the shaft $d^4$, and at an angle of about thirty degrees with the plane of the bed.

Considered with reference to its center, and apart from its rotary motion, the cutter has two adjustments by means of the sliding carriages, one being in a plane that passes through the axis of the drill-blank and the other in a plane at right angles to the first. The first adjustment determines the depth to which the groove in the blank will be cut, and the other is needed to set the cutters $c$ and $c'$ so that they shall work on diametrically-opposite sides of the drill, and with their centers always in a right plane passing through the axis of the drill. This insures absolute uniformity of the two grooves when cut.

The carriage $d'$ is clamped in place on the bed by bolts taking against a gib on the side of the slide. The carriage $d^2$ is moved by the feed-screw and hand-wheel, its inward play being limited by the stop $o$, which is formed by a screw-bolt borne in an arm, $o'$, fast to the lower carriage, $d'$. This stop determines the depth of the groove near the point of the drill; but as it is desirable to vary the thickness of the web of the drill and to increase it from point to shank, the slide $m'$ has an inclined guide, $m^3$, (see Figs. 2, 12, and 14,) that projects from the face of the slide and between the ears or lugs $m^4$ on the side of the lower carriage, $d'$. Fig. 12 shows the slide and guide in horizontal section and the lugs in plan view, and in Fig. 14 these parts are shown in vertical section on plane $z$ $z$ of Fig. 12.

The operation of this part of the device is as follows: The spindle holding a drill at the upper end of its play, the machine is started and the drill is moved downward between the cutters. The slide-yoke moves the slides, and with them the guide $m^3$, that by its inclined face retracts the carriage $d'$, and with it the cutter $c$, at a rate and for a distance determined by the angle at which the guide departs from the vertical. Exactly duplicate parts and cutter-operating devices are arranged on the opposite side of the bed, and the two cutters $c$ and $c'$ operate simultaneously, although driven by belts from separate pulleys on the countershaft. In its downward path the drill-blank moves in a vertical opening, $s'$, in the guide and rest $s$, that is removably secured, as by a thread and nut, in a socket in the bed in line with the axis of the drill.

The opening in the guide is but slightly larger than the diameter of the drill, and in the vertical walls of the guide, upon diametrically-opposite sides, the cutter slots $s^2$ $s^3$ are made by the cutters without a drill in the guide, and of a length and width to allow the cutters to work through them and not get clogged by chips.

Different sizes of guides are provided for different diameters of drills.

The guide is of especial use in steadying the drill while the cutters are at work, and in preventing, in a great measure, the formation of a burr on the edge of the land, and when the drill is withdrawn the lower inner edge of the cutter-slot shaves off a great part of what little burr the cutters have thrown out on the land. This method of cutting the grooves in the drill forms a clean and even cutting-edge on the land, and throws up the burr on the opposite edge of the groove that forms the back of the land, which is of advantage in the further steps of clearing and finishing the drill.

The vertical position of the drill-blank enables the whole of the feeding mechanism to be placed above the cutters, and the streams of oil, that are turned upon the cutters by any convenient attachment of reservoir and pipes, carry the chips and waste downward and prevent clogging of the working parts.

As soon as a drill-blank has been grooved in this machine the stop mechanism $t$ operates to throw the worm out of mesh with the gear $h^2$ and stops the spindle. This stop mechanism is illustrated in Figs. 1, 3, 7, 8, and 9, where the letter $t'$ denotes a spring seated in a socket in the bracket $j^4$, and tending to throw the right hand end of the frame outward. This outward motion is, however, prevented by the latch $t^2$, that slides vertically in a socket in the side of bracket $j^4$, this latch forming the upper end of the stop-rod $t^3$, that extends downward through suitable supports on the frame $f$ and bears a movable arm, $t^4$, having a clamp-screw, by means of which it is adjustably attached to the rod in such position that the yoke $m$, in its downward motion, shall strike the arm and pull down the stop-rod and the latch, so that the frame $j'$ is released, and, swinging back under the pull of spring $t'$, throws the worm $j^6$ out of mesh with the gear $h^2$ and stops the spindle $g$.

A short shaft is journaled in bearings in the bracket $p$ of the frame $f$, and bears on its inner end a cog-wheel, $p'$, and on its outer a hand-wheel, $p^2$, by means of which, when the driving-shaft $j'$ is thrown out of gear, the spindle $g$ may be rapidly raised and lowered.

The operation of my machine is as follows: A drill-blank is secured, in any suitable chuck, in the lower end of spindle $g$, (made hollow and supporting a rod that serves to remove the drill after grooving,) when it is at the upper limit of its path, and the spindle is lowered, as by means of the hand-wheel, until the lower end of the drill-blank is supported in the guide $s$. The driving-shaft and worm of frame $j'$ are thrown into position to drive the spindle $g$, and are held by the latch of the stop mechanism while the drill-blank is rotated and fed downward between the cutters. The latter have been adjusted to the proper position and cut the grooves to a depth determined by the sliding guides, and to a pitch determined by the feed devices. As soon as the grooves are cut the spindle $g$ is stopped and the drill removed, as described. In the eccentric guide $n$ the straight part of the cam-slot forms a sort of "dwell," during which time the pitch of the grooves, as cut in the drill, is regular from the point backward to an extent determined by the length of the straight part of the slot, and the increased pitch then begins and continues, as determined by the curve of the slot. This produces a drill that has the surface of the grooves at a constant angle with a plane through the axis, so that the drill can be sharpened on a machine to the proper angle of the cutting-lip, (about twenty-seven degrees and forty minutes,) and when worn can be resharpened a number of times without departing from the proper angle, as is the result with the drills as heretofore made, which have a continually-increasing pitch of the grooves from the point to the shank. The result is a cheaper, because more durable, drill.

I claim as my invention—

1. In combination, a standard, $a$, bed $b$, frame $f$, driving-shaft $j$, spindle $g$, feed mechanism $k$, shaft $l'$, bearing worm $l^4$, in mesh with gear $i'$, fast to rotary sleeve $i$, splined to the reciprocating spindle $g$, all substantially as described.

2. In combination, a frame, $f$, rotary reciprocating spindle $g$, feed mechanism $k$, swinging frame $j'$, bearing driving-shaft $j$, with worm $j^6$, rotary nut $h$, bearing worm-gear $h^2$, and stop mechanism $t$, all substantially as described.

3. In combination, frame $f$, rotary and reciprocating spindle $g$, increase-feed mechanism $l$, and feed mechanism $k$, all substantially as described.

4. In combination with a worm-gear, a rotary and longitudinally-moving shaft bearing a worm, and an eccentric guide or cam, all substantially as described.

5. In combination, a frame, $f$, rotary shaft $l'$, sliding in bearings on the frame, slide $l^5$, eccentric guide $n$, pivoted to a slide and having a cam-slot, $n'$, into which projects and works a pin, $k^7$, on a sliding bar, $k^5$, all substantially as described.

6. In combination, a frame, $f$, sliding rotary spindle $g$, bearing yoke $m$, slides $m' m^2$, eccentric guide $n$, and shaft $l'$, connected and operated by the guide $n$, all substantially as described.

7. In combination, a bed, $b$, frame $f$, sliding rotary spindle $g$, bearing yoke $m$, slides $m' m^2$, with inclined guides $m^3$, and cutter-carriages $d'$, with lugs $m^4$, embracing the guide, all substantially as described.

MOSES C. JOHNSON.

Witnesses:
CHAS. L. BURDETT,
E. F. DIMOCK.